(12) United States Patent
Partiel et al.

(10) Patent No.: US 9,894,883 B1
(45) Date of Patent: Feb. 20, 2018

(54) RELEASABLE VEST/WRAP WORN ON A BODY PART TO FACILITATE HANDS-FREE DOG WALKING AND RETENTION OF A PORTABLE ELECTRONIC DEVICE IN AN OPERATIVE CONDITION

(71) Applicants: David Partiel, Los Angeles, CA (US); Daniel Krakowski, Burbani, CA (US)

(72) Inventors: David Partiel, Los Angeles, CA (US); Daniel Krakowski, Burbani, CA (US)

(*) Notice: Subject to any disclaimer, the term of this patent is extended or adjusted under 35 U.S.C. 154(b) by 193 days.

(21) Appl. No.: 14/794,703

(22) Filed: Jul. 8, 2015

(51) Int. Cl.
| | |
|---|---|
| *A01K 27/00* | (2006.01) |
| *A01K 29/00* | (2006.01) |
| *A41D 1/04* | (2006.01) |
| *A41D 1/00* | (2018.01) |
| *A41D 27/20* | (2006.01) |

(52) U.S. Cl.
CPC .......... *A01K 27/008* (2013.01); *A01K 27/002* (2013.01); *A01K 29/00* (2013.01); *A41D 1/002* (2013.01); *A41D 1/04* (2013.01); *A41D 27/20* (2013.01); *A41D 27/205* (2013.01)

(58) Field of Classification Search
CPC .. A01K 27/001; A01K 27/002; A01K 27/003; A01K 27/004; A01K 27/005; A01K 27/008; A01K 29/00; A41D 1/04; A41D 1/002; A41D 27/205; A62B 35/0018
USPC ....... 119/769, 770, 792, 795, 772, 774, 857; 2/102; 482/124; 182/3
See application file for complete search history.

(56) References Cited

U.S. PATENT DOCUMENTS

| | | | | |
|---|---|---|---|---|
| 4,667,624 A | * | 5/1987 | Smith | ............... A01K 27/00 119/770 |
| 4,879,972 A | | 11/1989 | Crowe et al. | |
| 5,038,719 A | * | 8/1991 | McDonough | .......... A01K 27/00 119/772 |
| 5,161,486 A | | 11/1992 | Brown | |
| 5,211,321 A | | 5/1993 | Rodriguez | |
| 5,806,466 A | * | 9/1998 | Pintor | ............... A01K 27/00 119/770 |
| 5,842,444 A | * | 12/1998 | Perrulli | ............... A01K 27/00 119/770 |
| D408,598 S | | 4/1999 | Martell | |
| 6,192,835 B1 | | 2/2001 | Calhoun et al. | |
| 6,626,131 B2 | | 9/2003 | Moulton, III | |
| 6,932,027 B1 | * | 8/2005 | Whitney | ............... A01K 27/00 119/770 |
| 7,240,638 B2 | * | 7/2007 | Burton | ............... A01K 15/02 119/770 |
| 7,467,604 B1 | * | 12/2008 | Werner | ............... A01K 27/00 119/770 |
| 7,516,717 B2 | * | 4/2009 | David | ............... A01K 27/00 119/770 |
| D611,681 S | | 3/2010 | Pettingill et al. | |
| 7,814,866 B1 | | 10/2010 | Gramza | |
| 8,250,671 B2 | | 8/2012 | Shadid | |
| 8,342,137 B1 | * | 1/2013 | Burkhardt | ............ A01K 27/003 119/770 |

(Continued)

FOREIGN PATENT DOCUMENTS

WO WO2008073087 6/2008

*Primary Examiner* — Trinh Nguyen
(74) *Attorney, Agent, or Firm* — Thomas I. Rozsa

(57) ABSTRACT

An improved device to retain a dog leash in a manner so that the garment can be used to walk the dog in a hands-free manner and also retain portable electronic devices in an operative condition while the dog is being walked.

16 Claims, 11 Drawing Sheets

(56) References Cited

U.S. PATENT DOCUMENTS

| | | | |
|---|---|---|---|
| 8,534,233 B1* | 9/2013 | Han | A01K 27/003 |
| | | | 119/792 |
| 2004/0194733 A1* | 10/2004 | Bremm | A01K 27/00 |
| | | | 119/770 |
| 2005/0039702 A1* | 2/2005 | Laffoon | A01K 27/00 |
| | | | 119/850 |
| 2010/0089338 A1* | 4/2010 | Stern | A47D 13/086 |
| | | | 119/770 |
| 2012/0260865 A1* | 10/2012 | Nesper | A01K 27/00 |
| | | | 119/792 |
| 2017/0156414 A1* | 6/2017 | Shadid | A41D 3/00 |
| 2017/0215384 A1* | 8/2017 | Smith | A01K 27/005 |

* cited by examiner

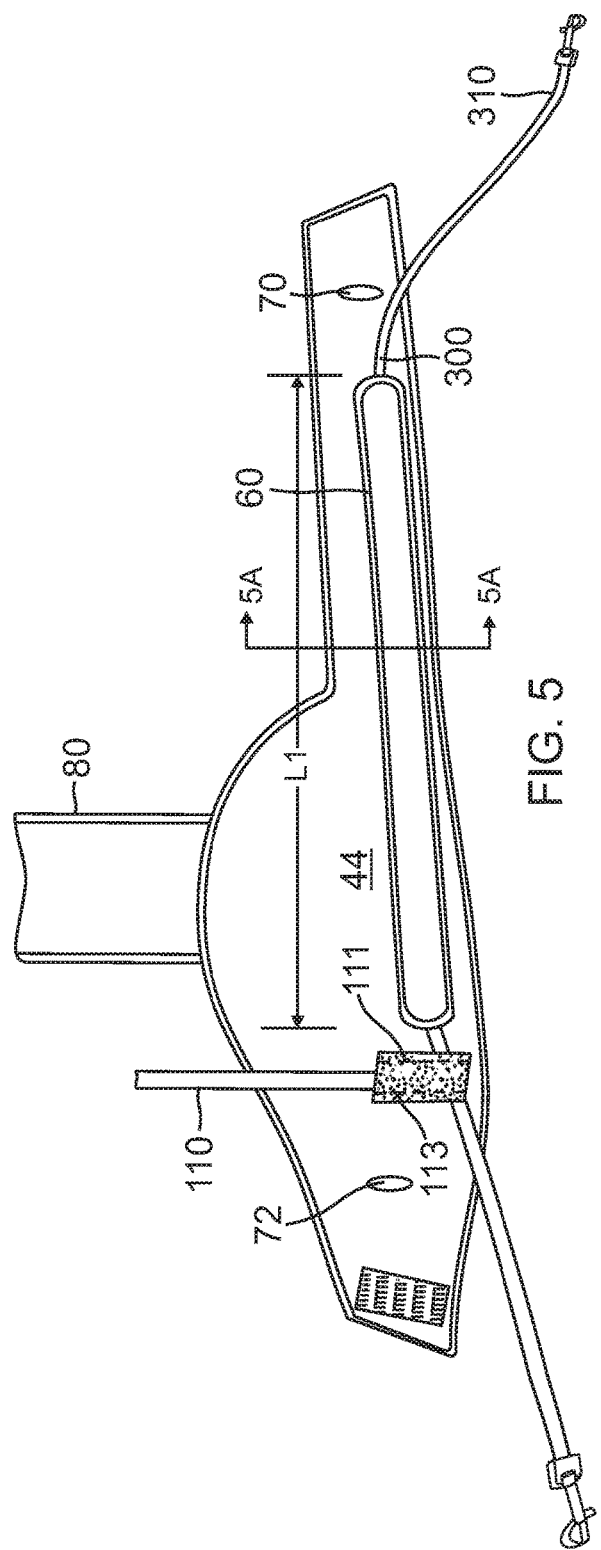
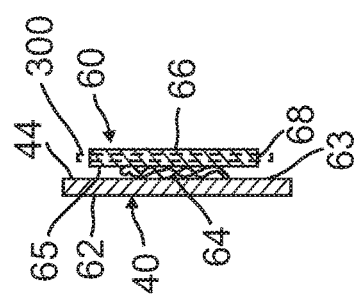
FIG. 5
FIG. 5A

RELEASABLE VEST/WRAP WORN ON A BODY PART TO FACILITATE HANDS-FREE DOG WALKING AND RETENTION OF A PORTABLE ELECTRONIC DEVICE IN AN OPERATIVE CONDITION

BACKGROUND OF THE INVENTION

1. Field of the Invention

The present invention relates to the field of wearable garments which help facilitate hands-free walking of animals such as a dog and also facilitate the retention of a portable electronic device such as a cell phone in a manner in which it can be operated while the wearer is also engaged in the process of walking dogs.

2. Description of the Prior Art

The inventors are aware of the following prior art patents and published applications which are relevant to their present invention.

1. U.S. Pat. No. 8,250,671 issued to Marg Shadid on Aug. 28, 2012 for "Utility Jacket for Dog Walking". This patent discloses a jacket which has belt loops around the center waist portion of the jacket and having clips on the belt loop which enable a remote end of a dog leash to be clipped to the clip on the belt to facilitate hands-free walking of a dog where the clip at the opposite side of the leash is attached to a dog's collar.

2. U.S. Pat. No. 6,192,835 issued to Jill M. Calhoun et al. on Feb. 27, 2001 for "Hands-Free Pet Leash System". It includes a belt worn around the wearer's waist which includes a loop mechanism to facilitate attachment to a dog leash. The mechanism itself can also be detachable from the dog leash so that a person can walk the dog without the leash or have the dog walk beside the leash without being affixed to the loop attached to the belt worn by the person.

3. U.S. Pat. No. 5,161,486 issued to Steve M. Brown on Nov. 10, 1992 for "Hands-Free Dog Jogger Apparatus". This discloses a belt loop worn around the waist with a clip on the belt loop which enables a dog leash to be clipped to the loop and the remote end of the leash affixed to a collar worn around the neck of a dog.

4. U.S. Pat. No. 4,879,972 issued to Dennis E. Crowe et al. on Nov. 14, 1989 for "Double Pet Walker". It essentially discloses a dog leash which has a branch onto which at least two separate leashes are affixed so that two separate dogs can be simultaneously walked.

5. U.S. Pat. No. 7,814,866 issued to Dale Gramza on Oct. 9, 2010 for "Back and Abdominal Support, Quick Release, Body Band for Hands-free Dog Walking". This invention discloses a band that is worn around the person's waist and which can be attached to a clip which in turn is attached to a dog's leash enabling the person to walk the dog.

6. U.S. Pat. No. 6,626,131 issued to Reynolds E. Moulton, III on Sep. 30, 2003 for "Hands-Free Leash System". This discloses a strap mechanism that goes over a person's shoulders with a loop around the strap mechanism to enable a dog to be attached to the center portion of the mechanism worn over the shoulders to facilitate hands-free walking of a dog.

7. U.S. Pat. No. Des. 408,598 issued to Janine C. Martell on Apr. 20, 1999 for "Utility Belt for Tethering a Dog Leash While Walking and Running". This essentially is a belt which contains a mechanism for retaining a leash where at the remote end the leash is affixed to a collar of a dog.

8. U.S. Pat. No. D611,681 issued to Sonja L. Pettingill et al. on Mar. 16, 2010 for "Utility Vest". This is a design patent and there is no description as to how it is used but it is a vest with a multiplicity of pockets and loops presumably through which belts or other longitudinal mechanisms can be affixed by having the mechanism, such as a belt, go through the loop.

9. U.S. Pat. No. 5,211,321 issued to Norton Rodriguez on May 18, 1993 for "Battery and Equipment Vest". This is a vest that is designed to hold a multiplicity of objects.

10. PCT Application No. WO 2008/073087 issued to Beverly Barad on Jun. 19, 2008 for "Travel/Sport Vest". It is a vest that has reflective surfaces thereon to protect the wearer when walking on a dark street.

While the above inventions describe hands-free dog walking, they do so by having the belt around a waist of a person or in the middle of a person's chest which would make it extremely difficult to walk one or more dogs in a hands-free manner and maintain balance and enable the dog to guide the owner. The known prior art creates a hazard if the dog sees another dog or some other object that causes the dog to run across the street essentially pulling the owner with the dog if the dog is a large animal such as a Great Dane or other large dog.

There is a significant need for an improved device to retain a dog leash in a manner so that the garment can be used to walk at least one dog in a hands-free manner and also retain a portable electronic device in an operative condition while at least one dog is being walked.

SUMMARY OF THE INVENTION

The present invention is a releasable vest/wrap which is designed to be retained around the upper thoracic-portion of a person's body including a front and back of the person and includes a shoulder section which enables the wrap to be retained over a person's shoulder. The first retention member is at least one pair of mating interior fasteners such as mating hook and loop fasteners. In one embodiment, the fasteners are spaced apart mating hook and loop fasteners with one of the mating members at spaced apart locations on an interior front portion of a wrap section wrapped around a thoracic area of a body part and the opposite spaced apart mating members on an interior surface of an outer covering section.

A second pair of mating fasteners includes a male clip member affixed to a front interior section of the wrap and extending through an opening in the exterior front cover to mate with a female clip portion. The double retention members facilitates a rapid release of the wrap. Therefore, in the event a person needs to be released from the wrap if the dog or dogs a person is walking chases another big dog and they are concerned about being able to control the dog and not be pulled to the ground or pulled behind the dog, the double release mechanism enables the wrap to be released so the person can be free from an aggressive dog.

The present invention further comprises an apparatus to retain a portable electronic device in an operative condition so that the person can use the portable electronic device such as a cell phone or smart phone while walking dogs in a hands-free manner.

The wrap can also include pockets for retaining a sunscreen container, a dog poop bag container, a water bottle, etc.

It is an object of the present invention to also provide a mechanism to retain a portable electronic device such as a cell phone in a manner so that it can be operated and used by the person while the person is walking at least one dog in a hands-free manner to enable the person to use the portable electronic device while at the same time enabling the person to walk one or more dogs in a hands-free manner.

It is also an object of the present invention to create a garment which contains a loop mechanism to retain at least one, and preferably two or more, ends of a leash which can be affixed to a collar of a dog so that two dogs can be walked at the same time.

It is an additional object of the present invention to have the leash modified so that the leash is wound in on itself to enable the leash to only have one dog at one side but have a double retention mechanism to facilitate walking the dog in a hands-free manner.

It is a further object of the present invention to have a wrap secured around a person's thoracic body area to have maximum control over dogs without using the person's hands.

It is an additional object of the present invention to have a hands-free dog walking apparatus at a sufficient height so that the dog's legs won't become entangled in the leash.

It is an additional object of the present invention to have a hands-free dog walking wrap which can be quickly unfastened and removed from the person.

It is a further object of the present invention to include within the garment an apparatus that retains a portable electronic device such as a cell phone in a manner so that the cell phone can be used while the person is engaged in other activities such as walking the dog in a hands-free manner. In addition, the apparatus includes mechanisms such as a solar charger so that the cell phone will continue to be charged and not run out of power if a person is engaged in a long hike or other activity where the person is not near a source of electricity.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 5 is a perspective view of the rear-interior portion of the present invention releasable vest/wrap;

FIG. 5A is a cross-sectional view taken along line 5A-5A of FIG. 5;

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
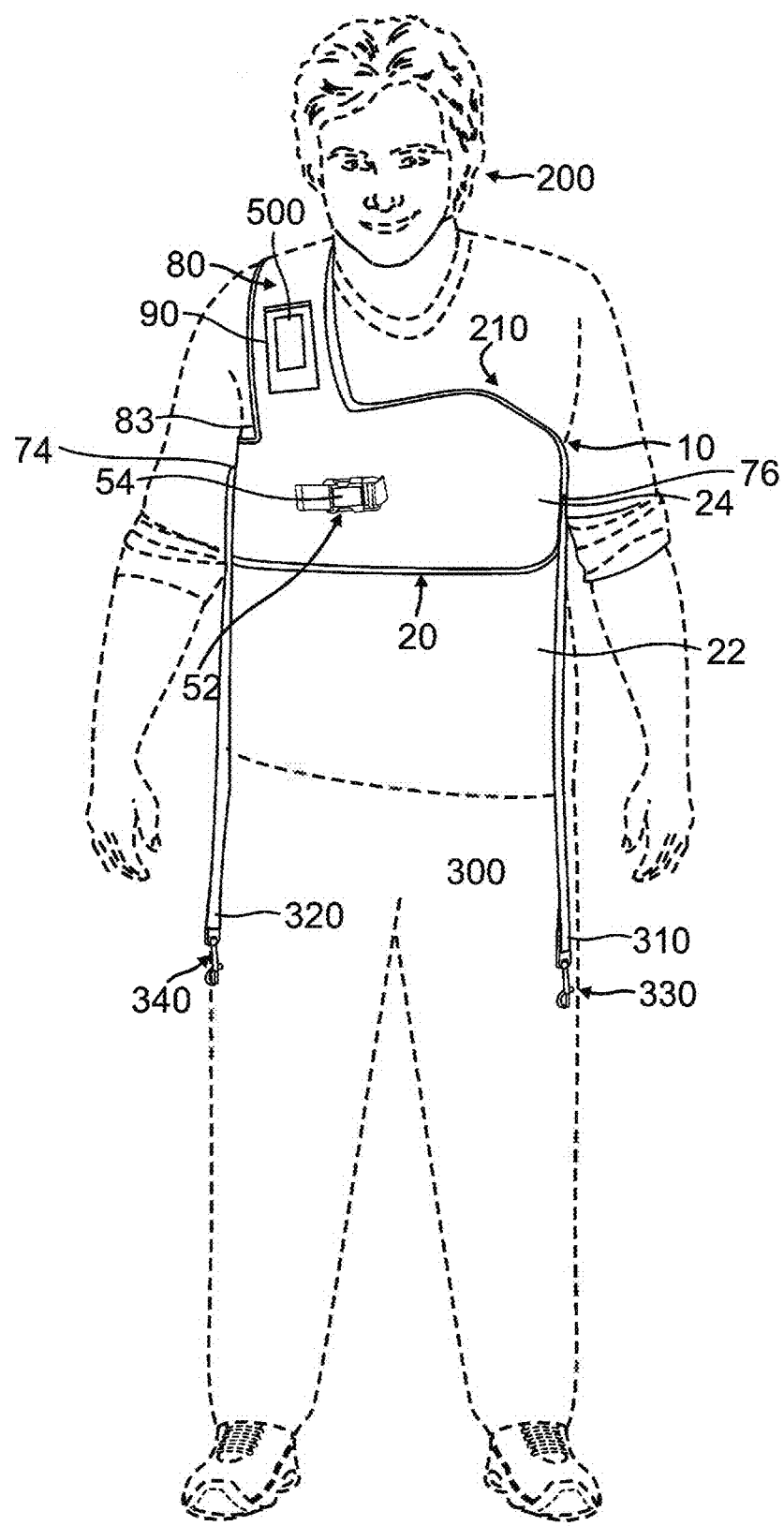
FIG. 1 is a front perspective view of the present invention releasable vest/wrap worn around a thoracic area of a person's a body part to facilitate hands-free walking of at least one dog and retaining a cell phone or other portable electronic device in an operative condition.

Referring to FIG. 1, there is illustrated a front perspective view of the present invention releasable vest/wrap 10 is used in conjunction with and worn around a thoracic area 210 of a person's a body part 200 to facilitate hands-free walking of at least one dog and retaining a cell phone or other portable electronic device in an operative condition. The releasable vest/wrap 10 includes a main wrap section 20 which includes a front cover section 22.

Figure 2:
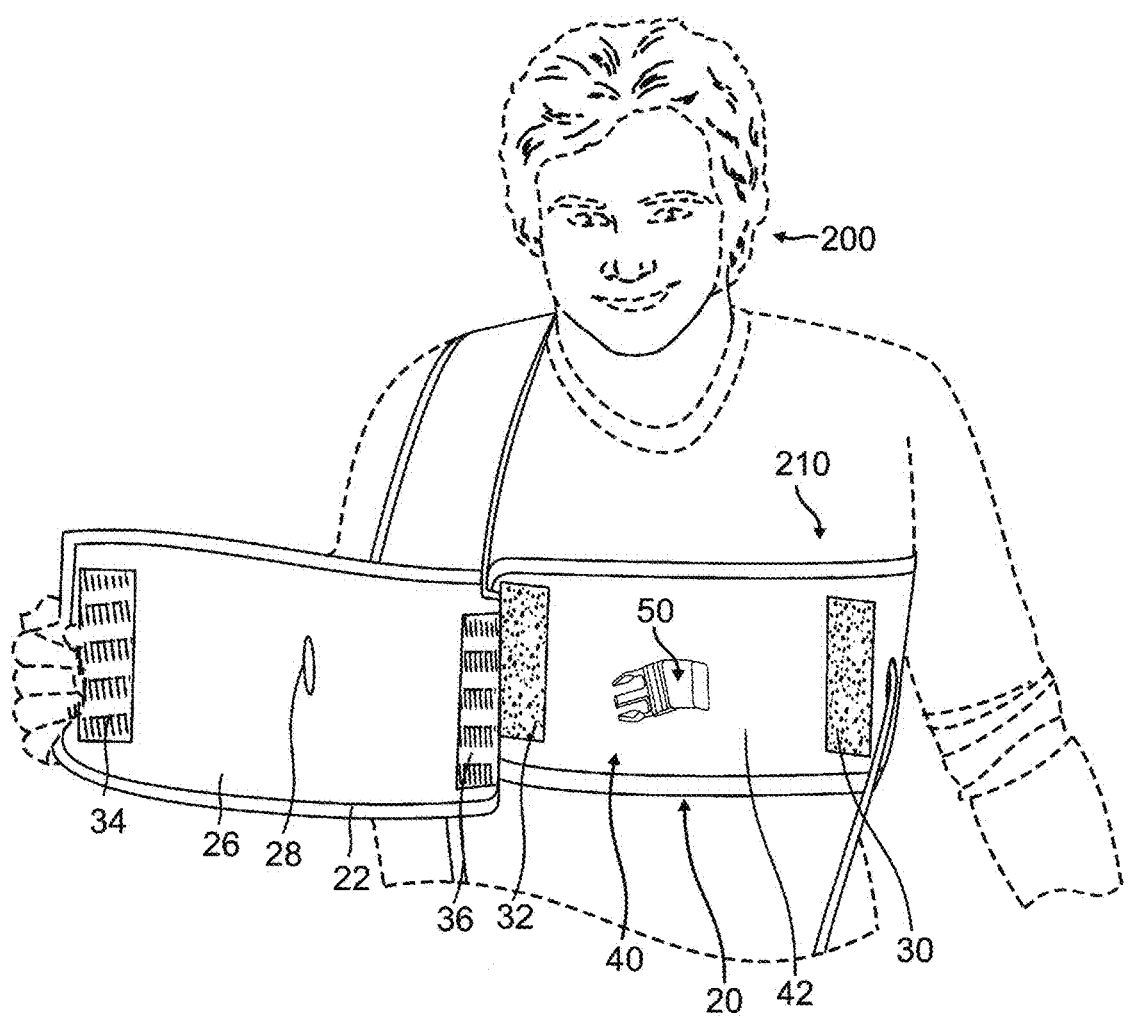
FIG. 2 is a front perspective view of the present invention releasable vest/wrap worn around a thoracic area in the partially opened condition to illustrate spaced apart mating fasteners and a male portion of a second fastener clip.
Figure 3:
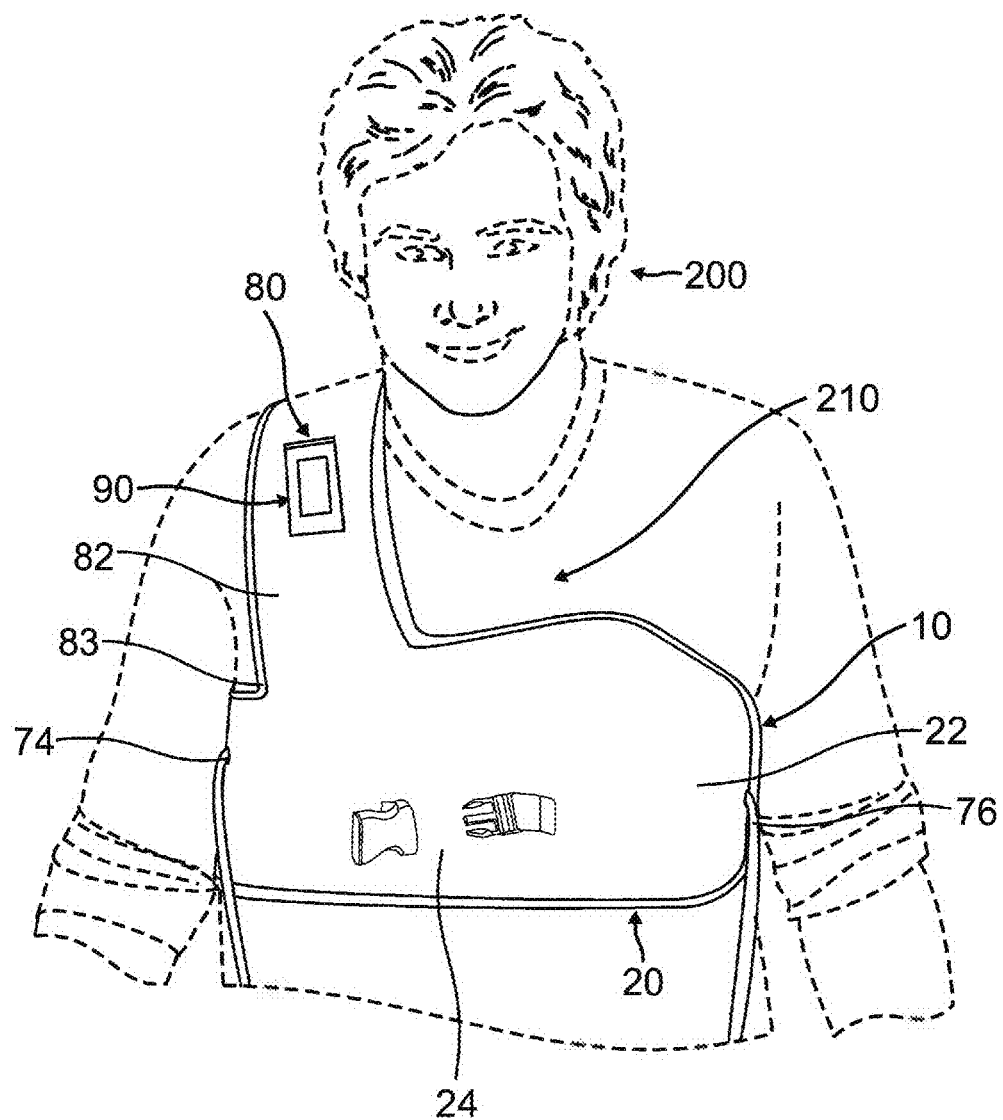
FIG. 3 is a front perspective view of the present invention releasable vest/wrap worn around a thoracic area of a person's a body part to facilitate hands-free walking of at least one dog and retaining a cell phone or other portable electronic device in an operative condition, with the second clip member in the opened condition.
Figure 4:
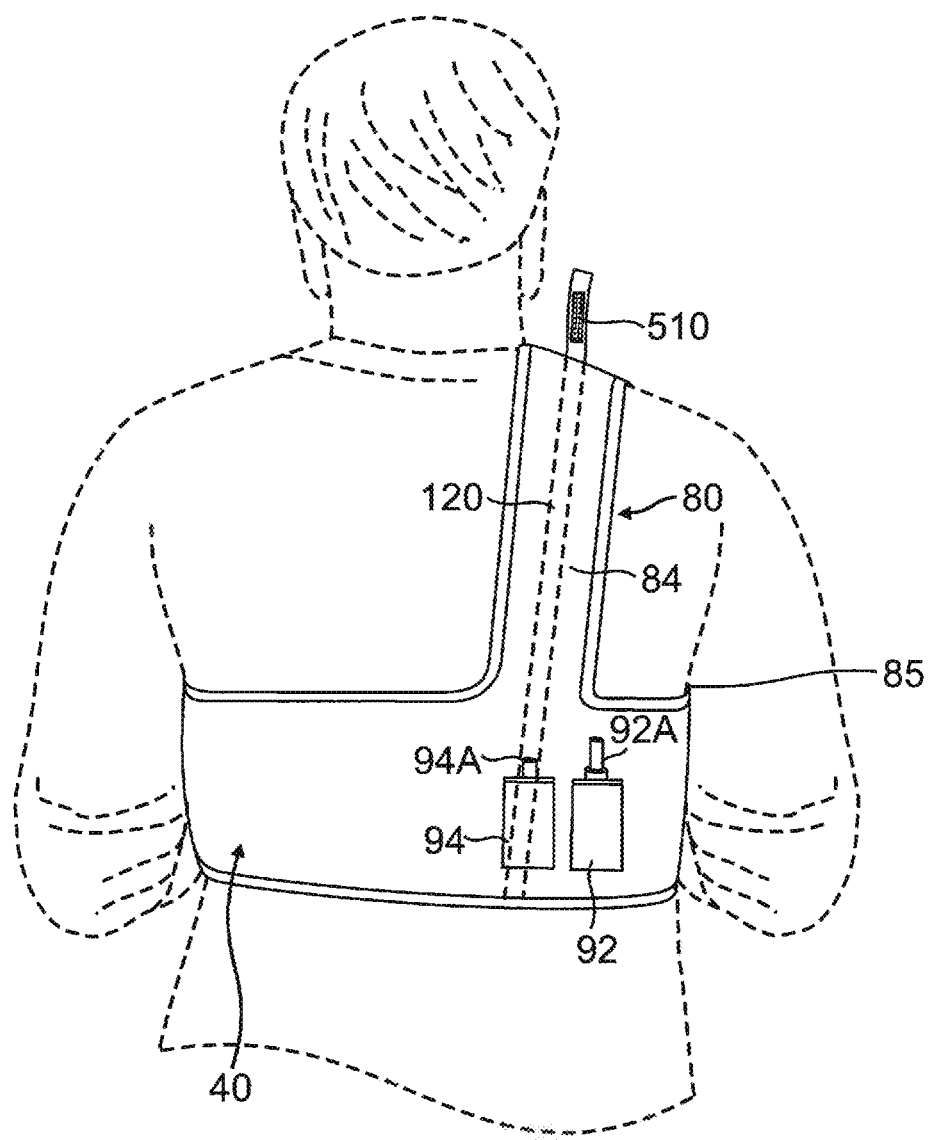
FIG. 4 is a rear perspective view of the present invention releasable vest/wrap worn around a thoracic area of a person's a body part to facilitate hands-free walking of at least one dog and retaining a cell phone or other portable electronic device in an operative condition, with the second clip member in the opened condition.

Referring to FIG. 2, there is illustrated is a front perspective view of the present invention releasable vest/wrap 10 used in conjunction with and worn around a thoracic area 210 of a person 200, the main wrap section 20 in the partially opened condition with the front cover section 22 pulled back to illustrate the body wrap section 40 which encircles the thoracic section 210 as further illustrated in the rear perspective view illustrated in FIG. 4.

The front cover section 22 includes a front surface 24 and a rear surface 26. The body wrap section 40 includes an exterior surface 42 (see FIGS. 2 and 4) and an interior surface 44 ((see FIG. 5). In a closed condition as illustrated in FIG. 1, the interior surface 26 of front cover section 22 faces the exterior surface 42 of body wrap section 40.

Referring to FIG. 2, the first quick release fastener member comprises a first hook or loop fastener 30 on the exterior surface 42 of body wrap section 40 and an aligned mating hook or loop fastener 34 on the interior surface 26 of front cover section 22. Preferably, the first closing member includes two spaced apart closing members such as first hook or loop fastener 30 and second spaced apart hook or loop fastener 32 both on the exterior surface 42 of body wrap section 40 and respectively aligned spaced apart first mating hook or loop fastener 34 and second spaced apart hook or loop fastener 36 both on the interior surface 26 of front cover section 22.

A second quick release fastener includes a male clip member 50 affixed to the exterior surface 42 of body wrap section 40 and an opening 28 extending through front cover section 22 from the rear surface 26 to the front surface 24 to enable male clip member 50 to extend through opening 28 to engage female clip member 52 on the front surface 24 of front cover section 22.

In the event it is necessary for the person 200 to discard the vest/wrap 10 in a hurry, the force on clip activation member 54 releases the female clip section 52 from the male clip section 50. The front cover section 22 is then pulled away from the exterior surface 42 of body wrap section 40 thereby disengaging the mating hook or loop fasteners 34 and 36 from the respective closing member hook or loop fasteners 30 and 32 to enable the person to quickly discard the vest/wrap 10 by removing an arm from a shoulder retaining section and discarding the vest/wrap 10.

Referring to FIGS. 5 and 5A, there is illustrated a rear interior surface 44 of the body wrap section 40. A sheath 60 has and interior section 62 affixed to the interior surface 44 of body wrap section 40 by an affixation member 64 selected from the group consisting of stitches and adhesive. The sheath 60 has a spaced apart cover section 66 with a gap 68 between inner surface 63 of interior section 62 and inner surface 65 of cover section 66. The sheath 60 extends for a given distance "L1" from adjacent a first side opening 70 in body wrap section 40 to adjacent a second side opening 72 in body wrap section 40. Referring again to FIG. 1, mating side opening 74 in exterior covering section 22 is aligned with opening 72 and mating side opening 76 in exterior covering section 22 is aligned with opening 70.

The hands-free vest/wrap 10 is used in conjunction with a leash 300 which extends through the gap 68 of sheath 60 and at one end 310 the leash 300 extends through aligned openings 70 and 76 and at a second end 320 the leash 300 extends through aligned openings 72 and 74. In one example, end 310 of leash 300 has a first clip 330 which can be affixed to a ring in a dog collar and end 320 of leash 300 has a second clip 340 which can be affixed to a ring in a dog collar. The leash can therefore be affixed to two separate dog collars so that a dog can be walked on either side of the person 200. The clips 330 and 340 can be affixed together so than one dog can be walked to a side of the person 200 or in front the person. The leash 300 can have a conventional hand loop at one end. The leash 300 can have any multiplicity of clips at either end or both ends so that any multiplicity dogs can be walked in a hands-free manner.

The muscles in the thoracic section are much stronger than the muscles around a person's waist. Sizing the vest/wrap 10 to encircle the thoracic section provides a person with greater control over one or more dogs. Positioning the hands-free vest/wrap 10 to encircle the thoracic section 210 of a person 200 also reduces the possibility that a dog's legs will become entangled in a leash.

Referring to FIGS. 1 through 4 and FIG. 7, there is illustrated a second component of the hands-free vest/wrap 10 which is a shoulder strap section 80 having a first or front end 82 at a first end 83 formed integral with front cover section 22 and a second or rear end 84 at a second end 85 formed integral with interior wrap section 40 so that an opening 86 (see FIG. 7) is formed between the shoulder wrap section 80 and the front cover section 22 and body wrap section 40 to enable a person's arm 220 to extend through the opening 86 so that the shoulder strap section 80 rests on a person's shoulder 240. The shoulder strap section 80 is sized to assure that body wrap section 40 and closing cover section 22 fit around a person's thoracic section 210. The shoulder strap section 80 may optionally have an adjustment member to assure an appropriate length of the shoulder strap section from the front cover section 22 to the body wrap section 40.

The hands fee vest/wrap has a multiplicity of pockets on the shoulder strap section 80 and on the body wrap section 40 such as pocket 90 to retain a cell phone and pockets 92 and 94 to retain a water bottle 92A, hand sanitizers, a container for poop bags 94A, etc.

Figures 6, 6A:
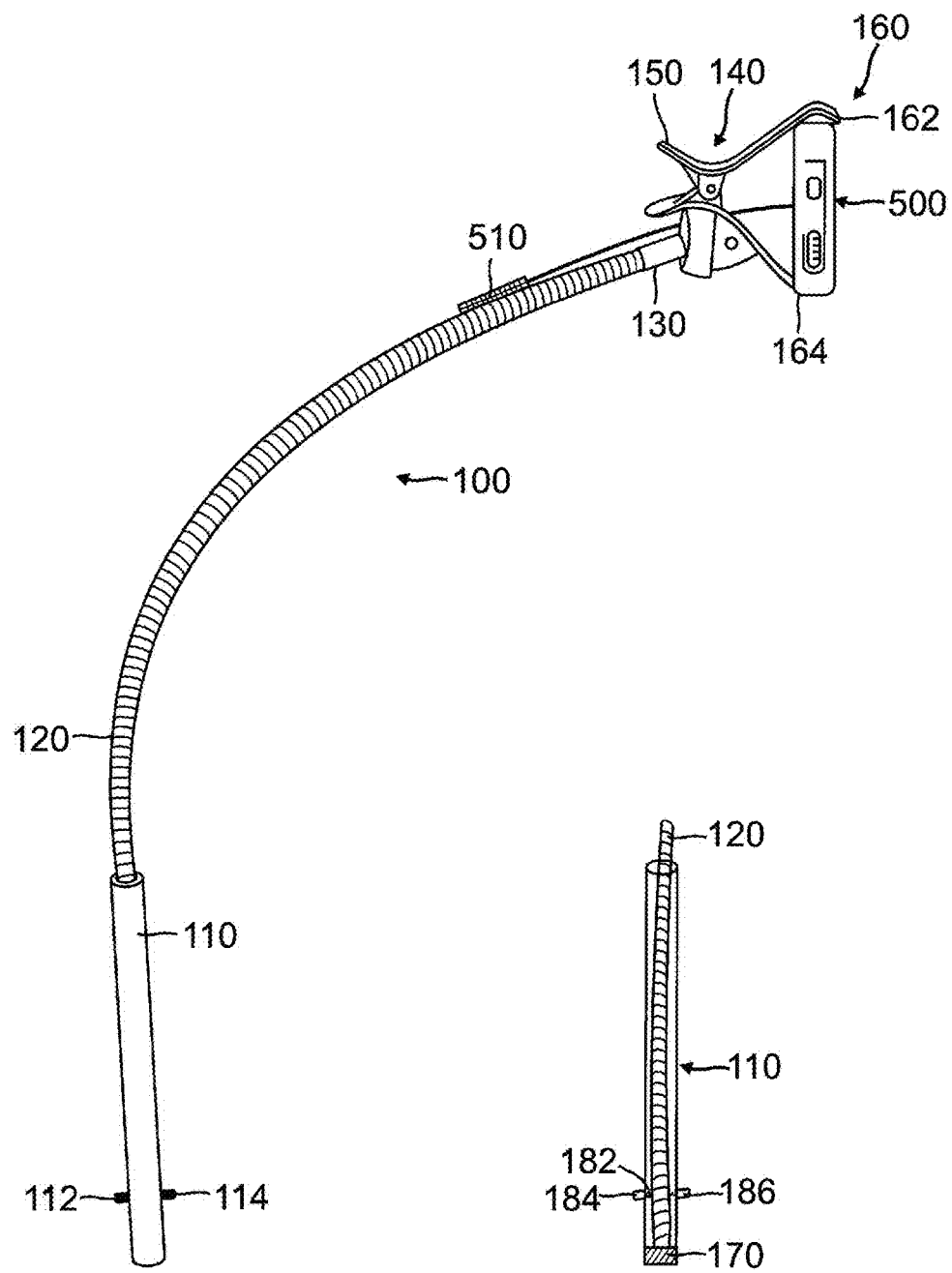
FIG. 6 is a side perspective view of the apparatus to retain a portable electronic device such as a cell phone or smartphone which is incorporated into present invention vest/wrap.
FIG. 6A is a cross-sectional view of the retaining tube.

FIG. 6 is a side perspective view of the apparatus 100 to retain a portable electronic device such as a cell phone or smartphone which is incorporated into the present invention vest/wrap 10. The apparatus 100 includes a retaining tube 110 into which a flexible retaining bar 120 is inserted At the distal end 130 of the flexible retaining bar 120 is a spring actuated retaining clip 140 which includes an actuation member 150 and a portable electronic device retaining member 160. An internal spring (not shown) forces the jaws 162 and 164 of the retaining member together. A compression force on the actuation member 150 forces the jaws 162 and 164 apart and a portable electronic device such as a cell phone 500 is inserted between the two jaws 162 and 164 and when the force on the actuation member 150 is released, the jaws 162 and 164 clamp and hold the smartphone 500. A solar charger 510 is affixed to the flexible bar and is hard wired or wirelessly connected to the cell phone.

Referring to FIG. 6A, there is illustrated a cross-sectional of the retaining tube 110 which includes an internal stopper 170 to prevent the flexible bar 120 from falling out of the retaining tube 110. The flexible bar 120 has an internal spring 182 with retaining pins 184 and 186 on opposite sides which extend through oppositely disposed openings 112 and 114 in the retaining tube 110. In use, the flexible bar 120 is inserted into the retaining tube 110 and pressed downwardly until the pins 184 and 186 respectively are aligned with openings 112 and 114 in the retaining tube 110. The spring force forces the pins out of the openings so that the flexible bar 120 is retained within the retaining tube by respective pins 184 and 186 extending through openings 112 and 114 forced into this position by the force of spring 182. To overcome this force, a pushing force on the two pins overcomes the force of the springs to enable the flexible bar 120 to be removed from the retaining tube.

It will be appreciated that it is within the sprit and scope of the present invention to have any other apparatus which accomplishes the same purpose which involves retaining the smartphone in an operative manner so that it can be used by the person 200. When the flexible bar is inserted and retained in the retaining tube as just described, referring to FIG. 7 the bar extends so that the cell phone can be adjusted so that it is in a location in front of the person's mouth or easily accessible by the person's hands. Therefore, by using the hands-free dog leash, the person can concentrate on conversations on the cell phone or smartphone or alternatively, use text messaging or other functions on the smartphone.

Figure 7:
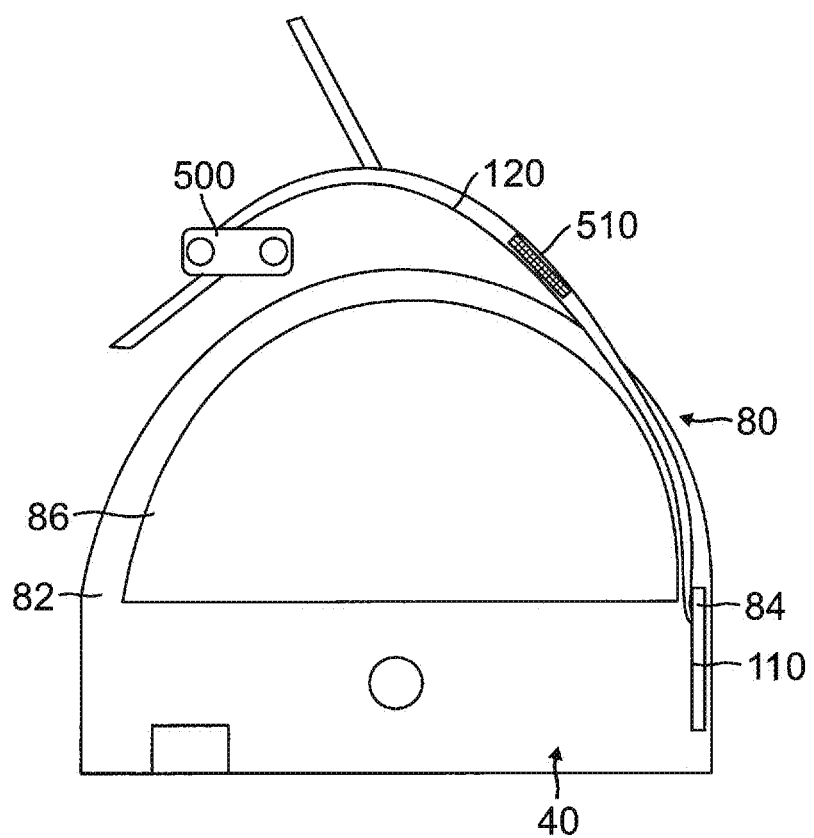
FIG. 7 is a side view of the present invention vest/wrap for hands-free dog walking incorporating the apparatus to retain a portable electronic device such as a cell phone or smartphone in an operative condition.

FIG. 7 is a side view of the present invention vest/wrap for hands-free dog walking incorporating the apparatus 100 to retain a portable electronic device such as a cell phone or smartphone 500 in an operative condition as previously described. Referring to FIG. 5, the retaining tube 110 is sewn into the wrap around section 40 and retained in a fixed orientation so that the flexible retaining tube can be inserted into and retrained in the tube 110. Retention members 111 and 113 inside wrap 40 may be used to assist in retaining the retention tube 110.

Figure 8:
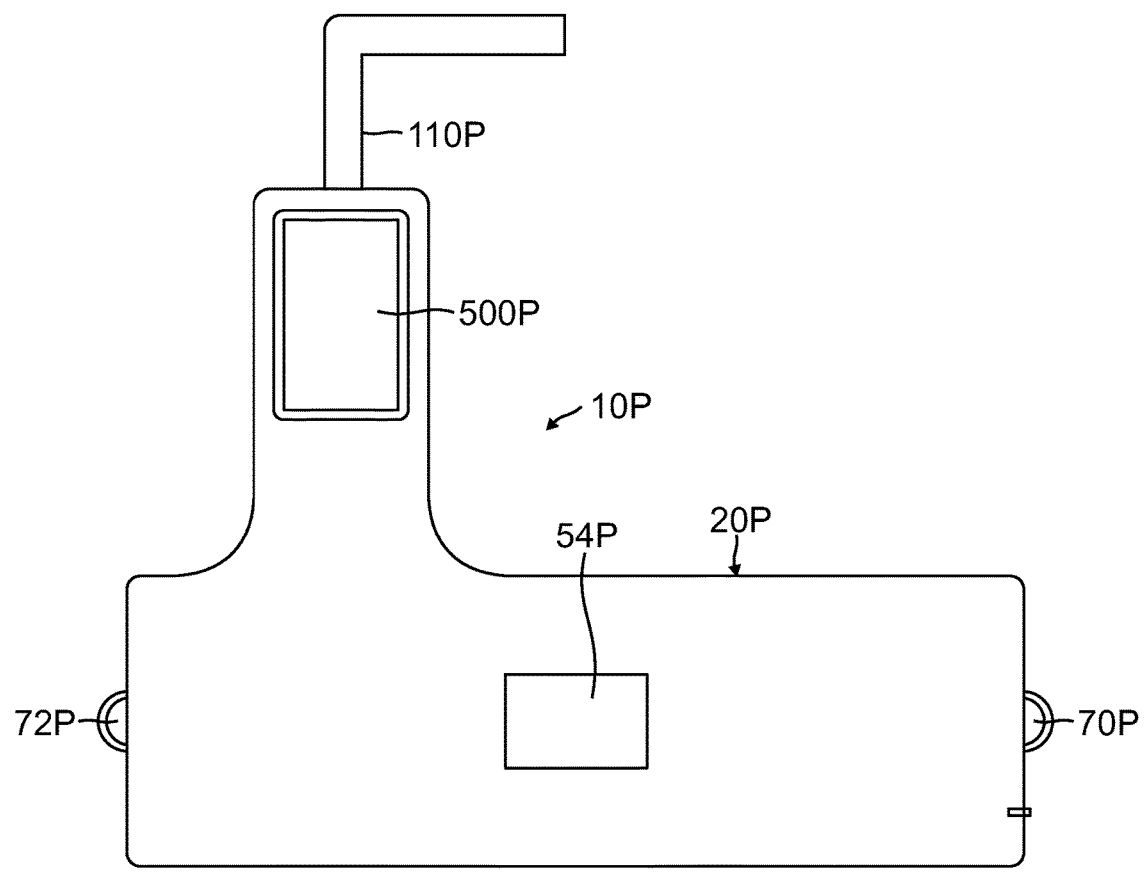
FIG. 8 is a photograph of a front elevational view of the present invention vest/wrap for hands-free dog walking.
Figure 9:
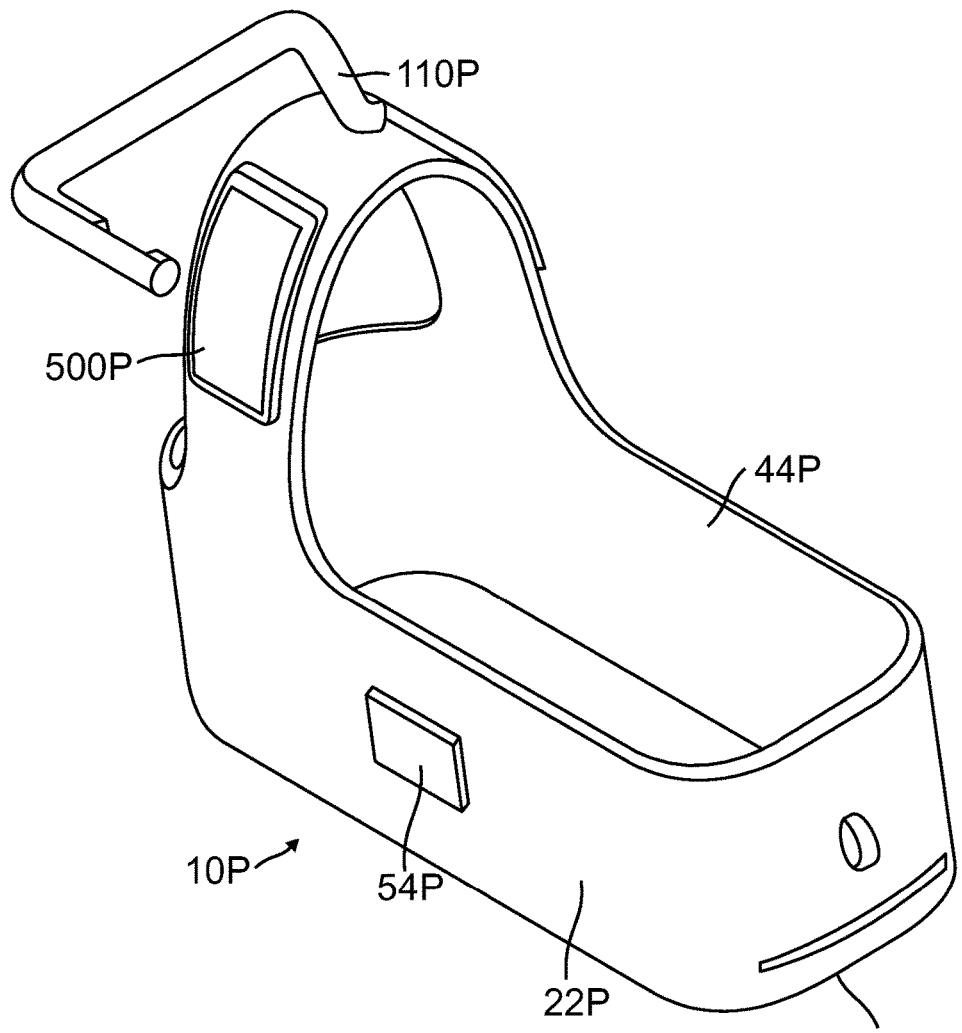
FIG. 9 is a photograph of a top right side perspective view of the present invention vest/wrap for hands-free dog walking.
Figure 10:
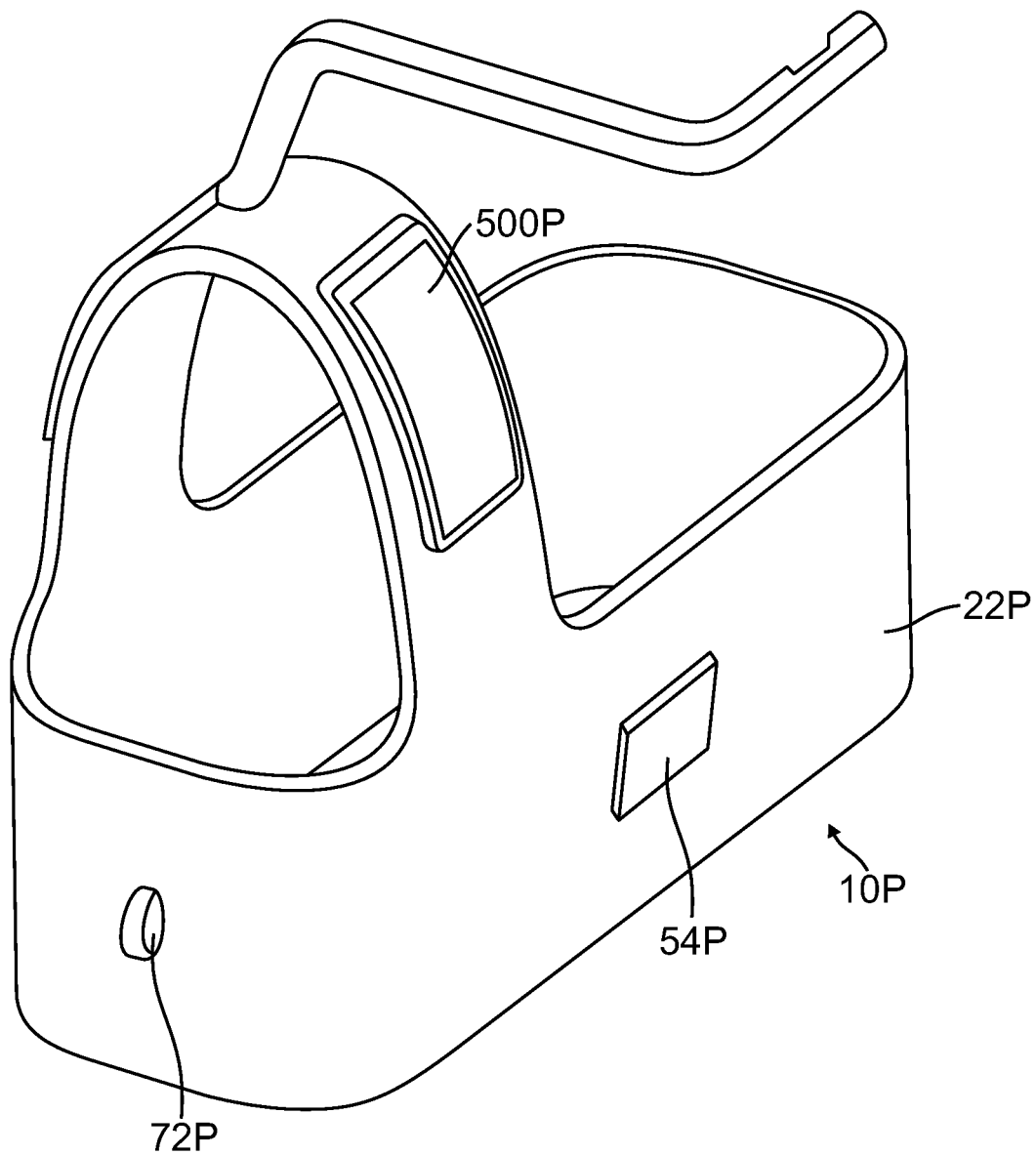
FIG. 10 is a photograph of a top left side perspective view of the present invention vest/wrap for hands-free dog walking.
Figure 11:
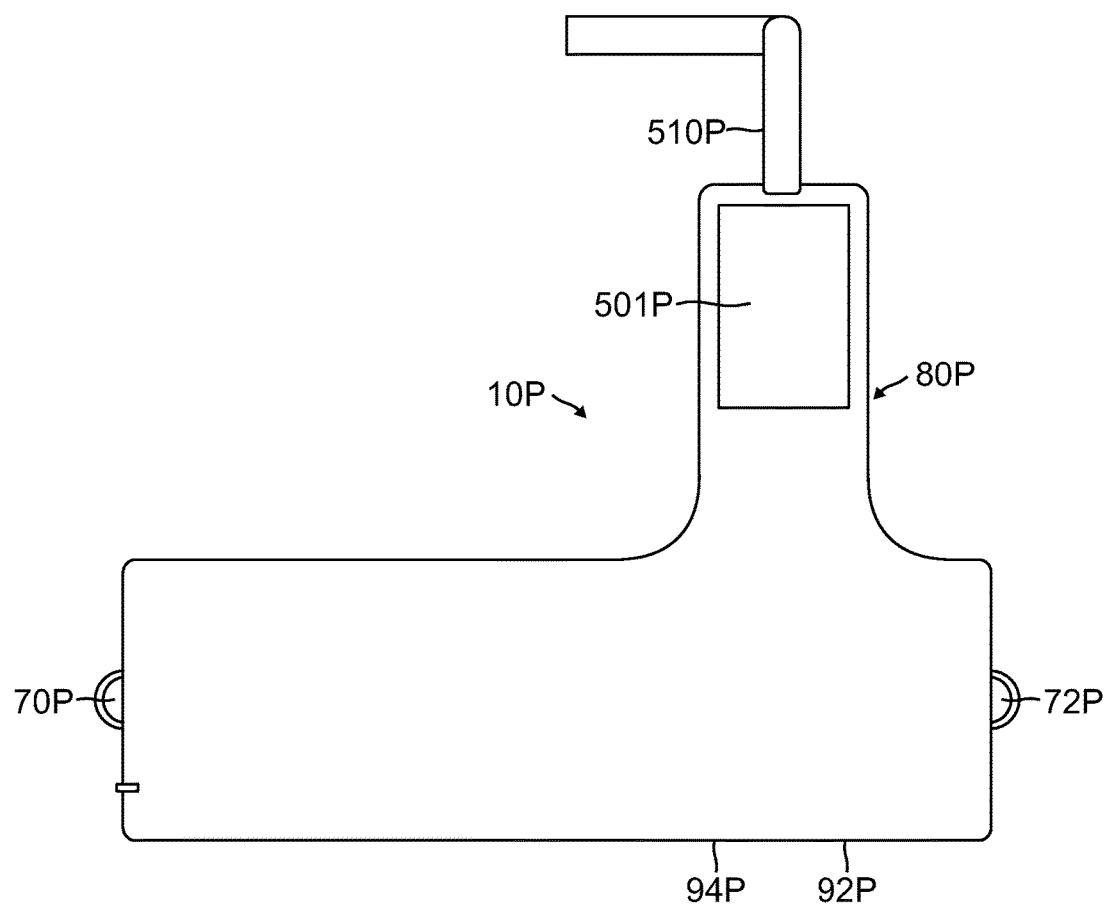
FIG. 11 is a photograph of a rear elevational view of the present invention vest/wrap for hands-free dog walking.

Also enclosed are photographs of the present invention which include FIG. 8 which is a photograph of a front elevational view; FIG. 9 which is a photograph of a top right side perspective view; FIG. 10 which is a photograph of a top left side perspective view and FIG. 11 which is a photograph of a rear elevational view of the present invention. All of the numbers previously mentioned for the corresponding parts have been numbered in the figures with the letter "P" after each part. One part 501P is different and not shown in the other drawings.

Therefore, the text will not be repeated since the text as previously discussed applies to the photographs in FIGS. 8 through 11 and the parts are numbered exactly as the previously described parts with the letter "P" after each part.

The present invention therefore provides the beneficial results of having the hands-free leash at a location high up on the person's body around the thoracic area where the muscles are much stronger than around a person's waist where the prior art typically focuses on having hands-free dog walking apparatus.

While the leash 200 has been shown having a pair of oppositely disposed clips 330 and 340, it will be appreciated that a regular conventional leash having a loop at one end and a clip at the other end can replace the double clip leash and also any multiplicity of clips can be inserted at the one or both ends of the leash so that any multiplicity of dogs can be walked.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A vest used in conjunction with a thoracic portion of a torso of a person, used in conjunction with a shoulder of a person, used in conjunction with a dog leash having a dog collar retaining member adjacent an end of the dog leash, and also used in conjunction with a portable electronic device, the vest comprising:
   (a) a wrap member having a front surface with a pair of spaced apart first retaining members and a male component of a third retaining member, a first side opening adjacent a first side of the front surface and a second side opening adjacent a second side of the front surface, a cover section having an inner surface with a pair of spaced apart second retaining members with a respective one of the first pair of spaced apart retaining members respectively aligned with a respective one of the second pair of spaced apart retaining members, an opening through which the male component of the third retaining member is inserted, a third side opening adjacent a first side of the cover member and aligned with the first side opening and a fourth side opening adjacent a second side of the cover member and aligned with the second side opening, the cover section having an outer surface with a female component of the third retaining member, the female component including a release clip;
   b. the wrap section extending from the front surface to a rear section which extends to a fixed end of the cover section, the cover section having an openable end spaced apart from the fixed end, a leash sheath retaining member affixed to an interior surface of the rear section of the wrap member and positioned between the first side opening and the second side opening;
   c. a shoulder section extending from an upper lengthwise side of the front surface of the wrap section to an upper lengthwise side of a rear section of the wrap member encompassing an opening between the shoulder section and the wrap section; and
   d. the vest further comprising a rod retaining member retained in the rear section of the wrap member, a flexible rod removably retained in the rod retaining member, the flexible rod having a portable electronic device retaining member at a distal end of the flexible rod;
   e. whereby, when the vest is worn by a person, the wrap around section is worn around the thoracic portion of the person, the shoulder section is worn over a shoulder of the person, the cover member is placed over the front surface of the wrap section, a respective one of the first pair of spaced apart retaining members respectively engaged with a respective one of the second pair of spaced apart retaining members, the male component of the third retaining member extends through the opening in the cover member and engages the female component of the third retaining member, a first end of a dog leash is inserted through the aligned second and fourth openings, through the leash sheath and a second end of the dog leash with the dog collar retaining member extending through the aligned first and third openings, a portable electronic device retained in the portable electronic device retaining member with the flexible rod positioned to enable the person to use the portable electronic device while walking a dog.

2. The vest in accordance with claim 1, further comprising:
   a. the leash sheath retaining member having a spaced apart cover section with a gap between interior surfaces of the cover section, an exterior surface of the cover section affixed to the interior surface of the rear of the wrap member; and
   b. the leash sheath retaining member extending for a given distance from adjacent the first side opening in the body wrap section to adjacent the second side opening in body wrap section.

3. The vest in accordance with claim 1, further comprising: the shoulder strap section is sized so that the body wrap section and the closing cover section fit around a person's thoracic section.

4. The vest in accordance with claim 1, further comprising:
   a. a multiplicity of pockets with at least one pocket on the shoulder strap section, and at least one pocket on the body wrap section; and
   b. each of the multiplicity of pockets respectively sized and shaped to retain an object selected from the group consisting of a cell phone, a smart-phone, a water bottle, a container for hand sanitizers, and a container for dog poop bags.

5. The vest in accordance with claim 1, further comprising:
   a. the rod retaining member includes a retaining tube into which the flexible retaining bar is inserted;

b. the retaining tube having a stop member at a distal location within the retaining tube; and c. the flexible bar inserted into the retaining tube at a proximal end of the retaining tube and retained within the retaining tube by an internal spring with retaining pins on opposite sides of the flexible bar which retaining pins respectively extend through oppositely disposed openings in the retaining tube.

6. The vest in accordance with claim 1, further comprising: the portable electronic device retaining member is a spring actuated retaining clip which includes an actuation member and jaws to retain the portable electronic device.

7. The vest in accordance with claim 6, further comprising a solar charger for the portable electronic device.

8. A vest used in conjunction with a thoracic portion of a torso of a person, used in conjunction with a shoulder of a person, and used in conjunction with a dog leash having at least one dog collar retaining member adjacent an end of the dog leash, the vest comprising:

(a) a wrap member having a front surface with at least one retaining member and a first mating component of an extra retaining member, a first side opening adjacent a first side of the front surface and a second side opening adjacent a second side of the front surface, a cover section having an inner surface with at least one retaining member aligned with the at least one retaining member if the front surface, an opening through which the first component of the extra retaining member is inserted, a third side opening adjacent a first side of the cover member and aligned with the first side opening and a fourth side opening adjacent a second side of the cover member and aligned with the second side opening, the cover section having an outer surface with a second component of the extra retaining member;

b. the wrap section extending from the front surface to a rear section which extends to a fixed end of the cover section, the cover section having an openable end spaced apart from the fixed end, a leash sheath retaining member affixed to an interior surface of the rear section of the wrap member and positioned between the first side opening and the second side opening; and c. a shoulder section extending from an upper lengthwise side of the front surface of the wrap section to an upper lengthwise side of a rear section of the wrap member encompassing an opening between the shoulder section and the wrap section;

d. whereby, when the vest is worn by a person, the wrap section is worn around the thoracic portion of the person, the shoulder section is worn over a shoulder of a person, the cover member is placed over the front surface of the wrap section, each of the aligned at least one retaining members are engaged, the first component of the extra retaining member extends through the opening in the cover member and engages the second component of the extra retaining member, a first end of a dog leash is inserted through the aligned second and fourth openings, through the leash sheath and a second end of the dog leash with the at least one dog collar retaining member extending through the aligned first and third openings.

9. The vest in accordance with claim 8, further comprising:

a. the leash sheath retaining member having a spaced apart cover section with a gap between interior surfaces of the cover section, an exterior surface of the cover section affixed to the interior surface of the rear of the wrap member; and b. the leash sheath retaining member extending for a given distance from adjacent the first side opening in the body wrap section to adjacent the second side opening in body wrap section.

10. The vest in accordance with claim 8, further comprising: the shoulder strap section is sized so that the body wrap section and the closing cover section fit around a person's thoracic section.

11. The vest in accordance with claim 8, further comprising:

a. a multiplicity of pockets with at least one pocket on the shoulder strap section, and at least one pocket on the body wrap section; and b. each of the multiplicity of pockets respectively sized and shaped to retain an object selected from the group consisting of a cell phone, a smart-phone, a water bottle, a container for hand sanitizers, and a container for dog poop bags.

12. The vest in accordance with claim 8 further used in conjunction with a portable electronic device, further comprising: a rod retaining member retained in the rear section of the wrap member, a flexible rod removably retained in the rod retaining member, the flexible rod having a portable electronic device retaining member at a distal end of the flexible rod.

13. The vest in accordance with claim 5, further comprising: a portable electronic device retained in the portable electronic device retaining member with the flexible rod positioned to enable the person to use the portable electronic device while walking a dog.

14. The vest in accordance with claim 13, further comprising:

a. the rod retaining member includes a retaining tube into which the flexible retaining bar is inserted;

b. the retaining tube having a stop member at a distal location within the retaining tube; and c. the flexible bar inserted into the retaining tube at a proximal end of the retaining tube and retained within the retaining tube by an internal spring with retaining pins on opposite sides of the flexible bar which retaining pins respectively extend through oppositely disposed openings in the retaining tube.

15. The vest in accordance with claim 14, further comprising: the portable electronic device retaining member is a spring actuated retaining clip which includes an actuation member and jaws to retain the portable electronic device.

16. The vest in accordance with claim 15, further comprising a solar charger for the portable electronic device.

\* \* \* \* \*